United States Patent
McDermott et al.

(10) Patent No.: US 9,511,878 B1
(45) Date of Patent: Dec. 6, 2016

(54) SYSTEM AND METHOD FOR ADAPTIVE Y-AXIS POWER USAGE AND NON-LINEAR BATTERY USAGE FOR UNMANNED AERIAL VEHICLE EQUIPPED WITH ACTION CAMERA SYSTEM

(71) Applicant: Trace Live Network Inc., Calgary (CA)

(72) Inventors: Craig McDermott, Cedar Rapids, IA (US); Bruce McDonald, Iowa City, IA (US)

(73) Assignee: Trace Live Network Inc., Calgary (CA)

( * ) Notice: Subject to any disclaimer, the term of this patent is extended or adjusted under 35 U.S.C. 154(b) by 0 days.

(21) Appl. No.: 14/825,914

(22) Filed: Aug. 13, 2015

Related U.S. Application Data

(60) Provisional application No. 62/036,864, filed on Aug. 13, 2014.

(51) Int. Cl.
| | |
|---|---|
| *G08B 21/00* | (2006.01) |
| *B64D 45/00* | (2006.01) |
| *B64C 39/02* | (2006.01) |
| *B64D 47/08* | (2006.01) |
| *B64C 27/08* | (2006.01) |
| *H04N 7/18* | (2006.01) |
| *G08B 21/18* | (2006.01) |

(52) U.S. Cl.
CPC .............. *B64D 45/00* (2013.01); *B64C 27/08* (2013.01); *B64C 39/024* (2013.01); *B64D 47/08* (2013.01); *G08B 21/185* (2013.01); *H04N 7/183* (2013.01); *B64C 2201/024* (2013.01); *B64C 2201/108* (2013.01); *B64C 2201/127* (2013.01); *B64C 2201/146* (2013.01)

(58) Field of Classification Search
CPC ......... B64D 45/00; B64D 47/08; B64C 27/08; B64C 39/024; B64C 2201/146; B64C 2201/024; B64C 2201/127; B64C 2201/108; H04N 7/183; G08B 21/185
USPC ...... 340/945, 947, 950, 960; 345/8, 46, 633, 345/156; 348/14.08, 46
See application file for complete search history.

(56) References Cited

U.S. PATENT DOCUMENTS

2010/0198514 A1* 8/2010 Miralles ................. F41G 7/008
701/302
2016/0097851 A1* 4/2016 Zhang .................... B64F 1/362
342/22

\* cited by examiner

*Primary Examiner* — Dhaval Patel
(74) *Attorney, Agent, or Firm* — Suiter Swantz pc llo

(57) ABSTRACT

A system and method for power management aboard an unmanned aerial vehicle (UAV) configured to follow a subject based on images captured by an onboard camera includes a power monitor that determines if available power from the UAV's onboard batteries has dropped below predetermined thresholds. If a low power level is detected, the power management system may divert power from nonessential systems to the attitude control system to keeping the UAV aloft. If a critical power level is detected, the power management system may shut down other UAV subsystems so that the attitude control system can safely land the UAV. The power management system may send an alert to a smartphone or other device carried by the subject. Position sensors of the subject's device may be used to interpolate the position of the UAV based on the subject's own position for recovery of the UAV.

20 Claims, 8 Drawing Sheets

SYSTEM AND METHOD FOR ADAPTIVE Y-AXIS POWER USAGE AND NON-LINEAR BATTERY USAGE FOR UNMANNED AERIAL VEHICLE EQUIPPED WITH ACTION CAMERA SYSTEM

CROSS-REFERENCE TO RELATED APPLICATIONS

This application claims priority under 35 U.S.C. §119(e) to provisional U.S. Patent Application 62/036,864 filed on Aug. 13, 2014. This application is related to U.S. patent application Ser. No. 14/642,370, filed Mar. 9, 2015, and U.S. patent application Ser. No. 14/802,871, filed Jul. 17, 2015. Said U.S. Patent Application 62/036,864, Ser. Nos. 14/642, 370, and 14/802,871 are herein incorporated by reference in their entirety.

TECHNICAL FIELD

Embodiments of the present disclosure relate generally to unmanned aerial vehicles (UAVs) and more particularly to systems and methods for power management aboard a UAV.

BACKGROUND

U.S. patent application Ser. No. 14/642,370 discloses a system for selecting an individual (ex.—target, subject) to follow (ex.—track) via an unmanned aerial vehicle (UAV) (ex.—drone, quadcopter) using an onboard camera to capture images. One or more image streams (e.g., a streaming video feed) may be generated from the incoming images and transmitted to external viewers or to a smartphone or other mobile device carried by the subject individual. Image processing and subject tracking systems aboard the UAV may extract image elements from the captured images. For example, incoming images may be analyzed to identify the subject as opposed to his/her surroundings, such as natural features or manmade landmarks, and the position of the UAV relative to the subject interpolated based on the subject's relationship to these features or landmarks. The subject's relative size, position, or orientation (compared to features or landmarks of known position or size, or compared to reference images depicting the subject) may inform the interpolation and determine changes in the position, heading, or velocity of the UAV necessary to maintain a predetermined orientation relative to the moving subject (e.g., 5 meters above and behind the subject's eye level) and thus follow the subject along a path or course, capturing images from a consistent perspective.

U.S. patent application Ser. No. 14/802,871 further discloses a system in which the UAV establishes a wireless link with the subject's smartphone or device, and a GNSS receiver or other position sensor of the device periodically "timestamps" the subject's position, associating a determined position with a fixed time. These timestamps may then be used to reunite the UAV and the subject in the event contact between the two is broken (i.e., visual contact is lost or the wireless link degrades). In both cases, the UAV (i.e., the rotors and motors responsible for propulsion or hovering) and its subsystems may be powered by onboard batteries or similar power supplies. These onboard power supplies may be required to power multiple components from a finite source. It may therefore be desirable for an unmanned aerial vehicle to manage power distribution among multiple components and subsystems, monitoring available power and prioritizing essential systems (i.e., maintaining the UAV inflight) when available power runs low. It may additionally be desirable for the UAV to safely land the UAV if power levels become critical. It may further be desirable to alert the subject if power levels become low or a critical landing is necessary.

SUMMARY

In a first aspect, embodiments of the present disclosure are directed to an unmanned aerial vehicle (UAV). For example, the UAV may have an airframe with multiple rotors fixed thereto (e.g., a quadcopter, hexacopter, octocopter, or other multi-rotor UAV), with one or more motors configured to rotate the rotors. The UAV may include an onboard attitude control system for controlling the position, heading, or velocity of the UAV by controlling the rotational speed of each rotor. The UAV may include one or more tracking components. For example, a camera mounted to the UAV may capture one or more images. An onboard image processor may stream the captured images for storage or transmission. Based on the incoming images, the UAV may select and follow an individual at a predetermined orientation, capturing a series of images from a consistent perspective relative to the subject. An onboard transceiver may transmit streaming images of the subject to viewers or to a mobile device carried by the subject. The transceiver may further establish a wireless link to the subject's mobile device. The UAV's motors as well as its onboard components and systems may be powered by one or more batteries or similar power sources having a finite capacity. A power monitor may continually determine the remaining power capacity and report it to a power management system, which controls the distribution of power to the UAV's propulsion system and onboard components. For example, if the available power drops below a warning threshold, the power management system may distribute power away from tracking components in favor of maintaining the UAV's propulsion systems. If the available power should drop below a critical threshold, the power management system may shut down all nonessential tracking components in favor of the motors and rotors, using the remaining power to execute a safe landing of the UAV.

In a further aspect, embodiments of the present disclosure are directed to a system for tracking a subject via an unmanned aerial vehicle as described above. In one embodiment, the system further includes a smartphone or other portable communications device carried by the subject. For example, the communications device may include a GNSS receiver, accelerometer, or other position sensor for determining a position of the subject and a clock for associating a fixed time with each position. The communications device may include a processor for generating a timestamp associating each sensed position of the subject with a time. The communications device may store the timestamp in memory or transmit the timestamp to the UAV via a transceiver linked to the UAV via the wireless link. When available power onboard the UAV drops below a threshold, the UAV may generate an alert and notify the subject by transmitting the alert to the communications device, where the alert may be displayed to the subject. If the UAV's available power drops below critical and a landing is required, the communications device may combine the predetermined orientation of the UAV relative to the subject with prior sensed positions of the subject to interpolate the likely location of the UAV.

In a still further aspect, embodiments of the present disclosure are directed to a method for power management aboard an unmanned aerial vehicle configured to follow or track a subject. For example, the method may include: determining whether the charge level of the UAV's power source is below a warning threshold; if the charge level is below the warning threshold, adjusting the distribution of power from the power source to the UAV's attitude control system and other components and subsystems to prioritize the attitude control system; generating an alert associated with the threshold; and transmitting the alert to a communications device carried by the subject via a transceiver of the UAV. If the threshold is a critical threshold, the UAV may shut down nonessential systems and direct the attitude control system to land the UAV, while the communications device may interpolate the location of the UAV and direct the subject to proceed there for reunion or recovery.

BRIEF DESCRIPTION OF THE FIGURES

Embodiments of the present disclosure may be better understood by those skilled in the art by reference to the accompanying figures in which.

DETAILED DESCRIPTION

Features of the present disclosure in its various embodiments are exemplified by the following descriptions with reference to the accompanying drawings, which describe the invention with further detail. These drawings depict only selected embodiments of the invention, and should not be considered to limit its scope in any way.

Figure 1:
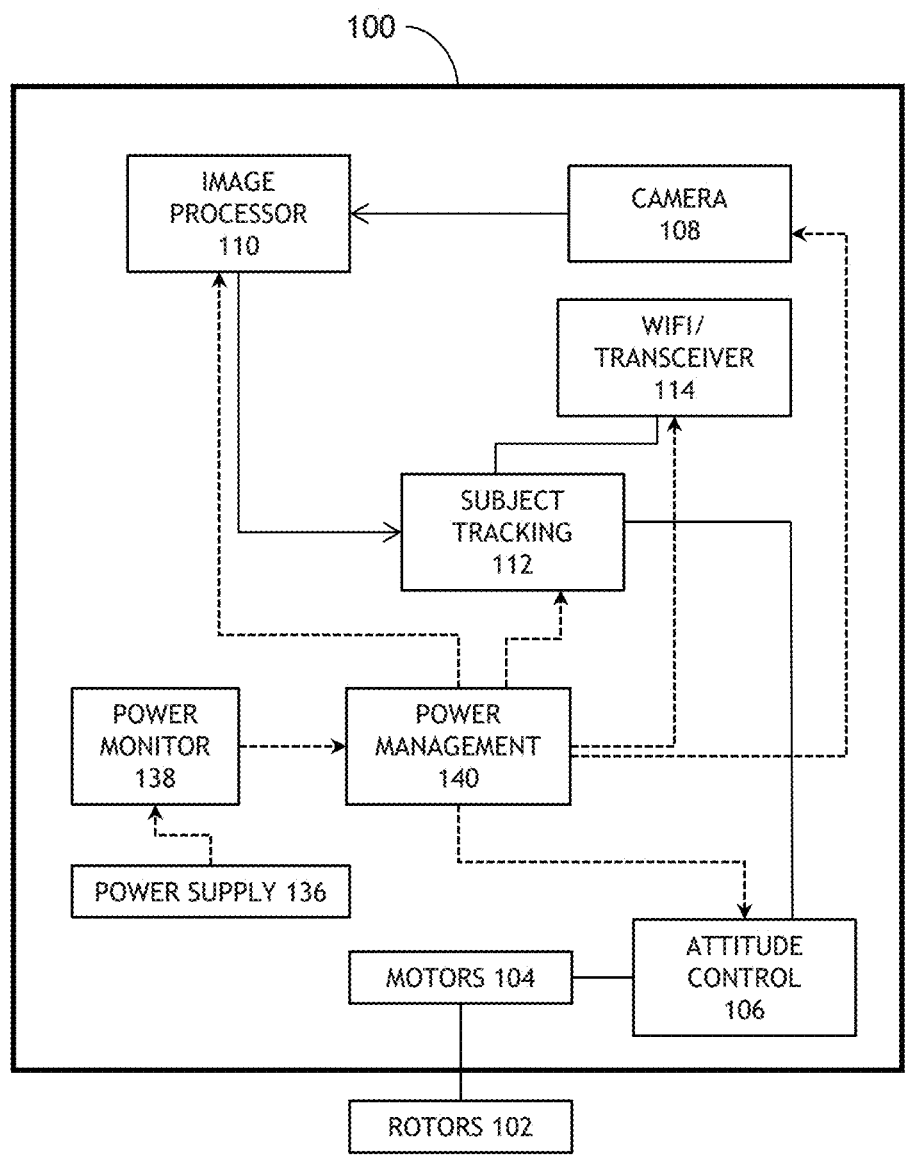
FIG. 1 is a block diagram of an unmanned aerial vehicle (UAV) according to embodiments of the present disclosure.

Referring to FIG. 1, in one embodiment an unmanned aerial vehicle (UAV) 100 may hover in place, rotate along multiple axes of rotation, or propel itself in three dimensions via rotors 102 fixed to the airframe. The rotors 102 may be rotated at one or more rotor speeds by motors 104 connected to the rotors. For example, a multi-rotor UAV 100 having four, five, six, or eight rotors (ex.—quadcopter, pentacopter, hexacopter, octocopter) may maneuver in three dimensions by varying the rotor speed of individual rotors, pairs of opposing rotors, or groups of rotors. An attitude control system 106 may translate maneuvering directions into the precise combination of rotor speeds necessary to achieve these maneuvers.

The UAV 100 may include other onboard subsystems and components. For example, the UAV 100 may be programmed to capture images with an onboard camera 108. An image processor 110 may compress the incoming images for onboard storage or for transmission to a third party or other end viewer. Based on the images captured by the camera 108, the UAV may select and follow an individual (designating that individual as the subject) at a predetermined orientation, capturing images (still images or a continuous video stream) of the subject from a consistent perspective. For example, a snowboarder may proceed through a racecourse after having been identified by the UAV 100 as a subject. Once the snowboarder starts through the course, a subject tracking system 112 of the UAV 100 may analyze images provided by the camera 108 or the image processor 110 to confirm that the subject remains in frame and to signal the attitude control system 106 to adjust the position, velocity, or heading of the UAV 100 to keep the subject centrally framed.

Figure 2:
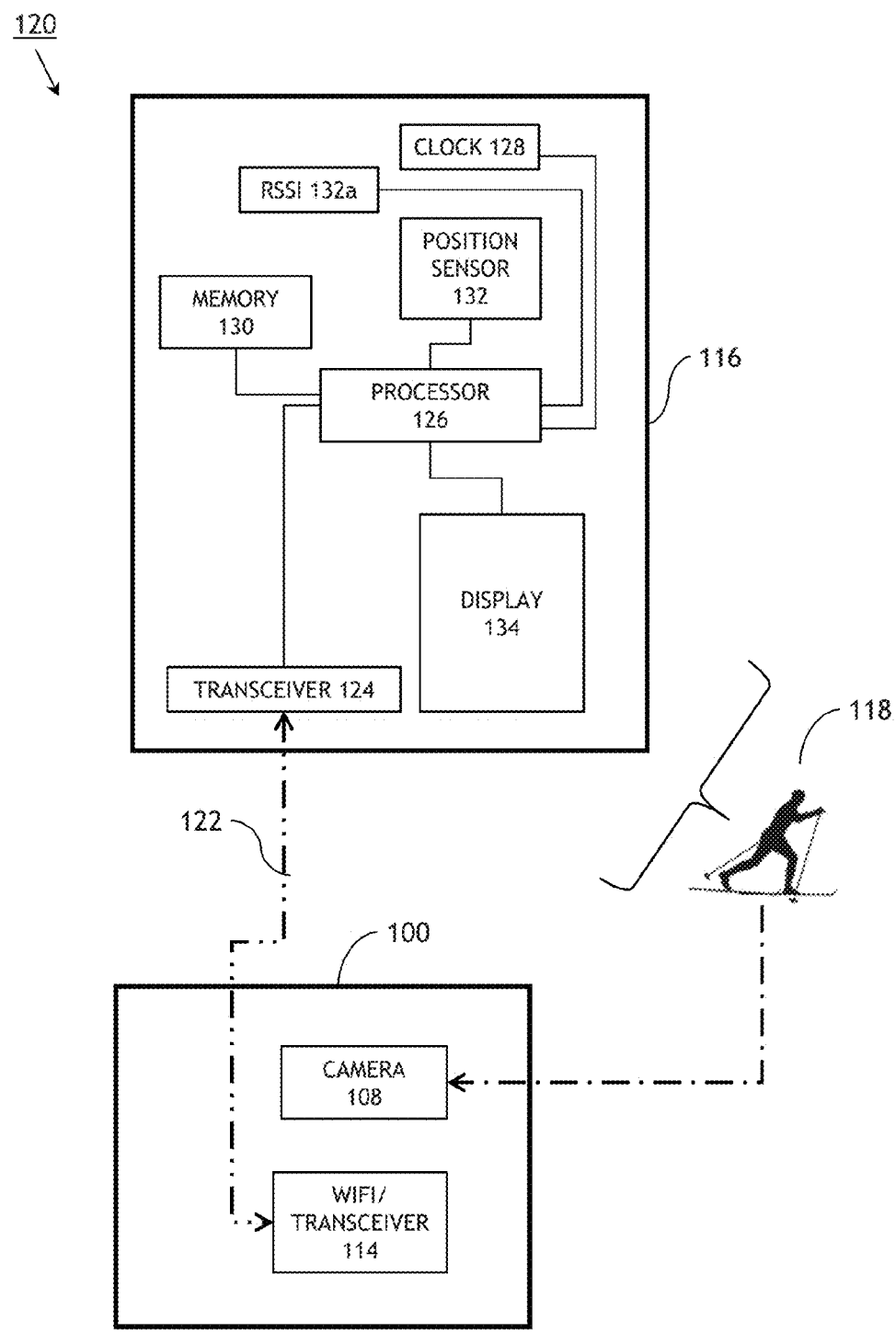
FIG. 2 is a block diagram of a system for following a subject via an unmanned aerial vehicle according to embodiments of the present disclosure.

Referring also to FIG. 2, an image stream based on the captured images may be generated and transmitted via an onboard transceiver 114 to third party viewers or to a smartphone or other communications device 116 carried by the subject 118. For example, a system 120 as illustrated by FIG. 2 may include a UAV 100 and a communications device 116 carried by the subject 118; the transceiver 114 of the UAV 100 may establish a wireless link 122 to a companion transceiver 124 of the communications device 118. For example, U.S. patent application Ser. No. 14/642,370 discloses embodiments of a UAV configured to follow a subject based on captured images. The communications device 116 may include a position sensor 132. For example, the position sensor 132 may be a GNSS (ex.—GPS, GLONASS, Compass) receiver or other absolute position sensor configured to determine, at intervals, an absolute position of the subject 118 (latitude, longitude, altitude). The position sensor 132 may be an accelerometer, magnetometer, compass, or other relative/inertial sensor configured to determine a relative position of the subject 118 (e.g., relative to a prior position of the subject 118). A processor 126 of the communications device 116 may generate a timestamp when the position sensor 132 determines a position of the subject 118, fixing the determined position with a precise time (e.g., determined by a clock 128 of the communications device 116). A generated timestamp may be stored in a memory 130 or other data storage space of the communications device 116. The timestamp may additionally include a signal strength of the wireless link 122 as measured by a Received Signal Strength Indicator (RSSI) 132a of the communications device 116. U.S. patent application Ser. No. 14/802,871 discloses embodiments of a system whereby a UAV links to a device of the subject and receives timestamps data from the device via the wireless link, using the timestamped data to attempt to reestablish visual contact with a lost subject. The communications device 116 may include a screen or other display unit 134.

The UAV and its components may be powered by a battery or other portable electronic or electrochemical power source 136. For example, the power source 136 may have a finite charge level. As the UAV 100 remains active, this charge level may drop below the level required to fully power all onboard systems and components, including the attitude control system 106 responsible for propulsion and maintaining the UAV 100 at a consistent orientation to the subject 118. Even past this point, the charge level of the power supply 136 may drop below the level required to keep the UAV 100 airborne. A power monitor 138 may at intervals determine the remaining power available from the power supply 136 and report this power level to a power management system 140, responsible for distributing power from the power supply 136 to the attitude control system 106, the transceiver 114, and the tracking components including the camera 108, the image processor 110, and the subject tracking system 112.

The power management system 140 may be preprogrammed with one or more power thresholds. For example, referring to FIG. 3, the UAV 100 may be following a subject 118 at a predetermined orientation 142: the UAV may position itself at a fixed angle, a fixed distance, and/or a fixed height relative to the subject 118. If the available power level drops below a warning threshold (e.g., 15 or 20 percent capacity), the power supply 136 may not have sufficient charge remaining to fully power all onboard systems of the UAV 100. The power management system 140 may respond by reducing the power supply to non-propulsion systems such as the camera 108, the image processor 110, and the subject tracking system 112, or by directing these systems to independently conserve power. For example, the camera 108 may reduce its frame rate or the image processing and tracking systems may operate with reduced precision. The power management system 140 may prioritize power distribution to the motors 104 (via the attitude control system 106), and may further direct the attitude control system 106 to conserve power by maintaining the UAV 100 at a fixed altitude (144) relative to the subject 118. The power management system 140 may notify the subject 118 of the warning threshold by generating an alert and transmitting the alert (146) to the communications device 116. The communications device 116 may alert the user via auditory alert (ex.—tone), haptic alert (ex.—vibration) or via a visual alert (text or graphic) displayed by the display unit 134 of the communications device 116.

Figure 3:
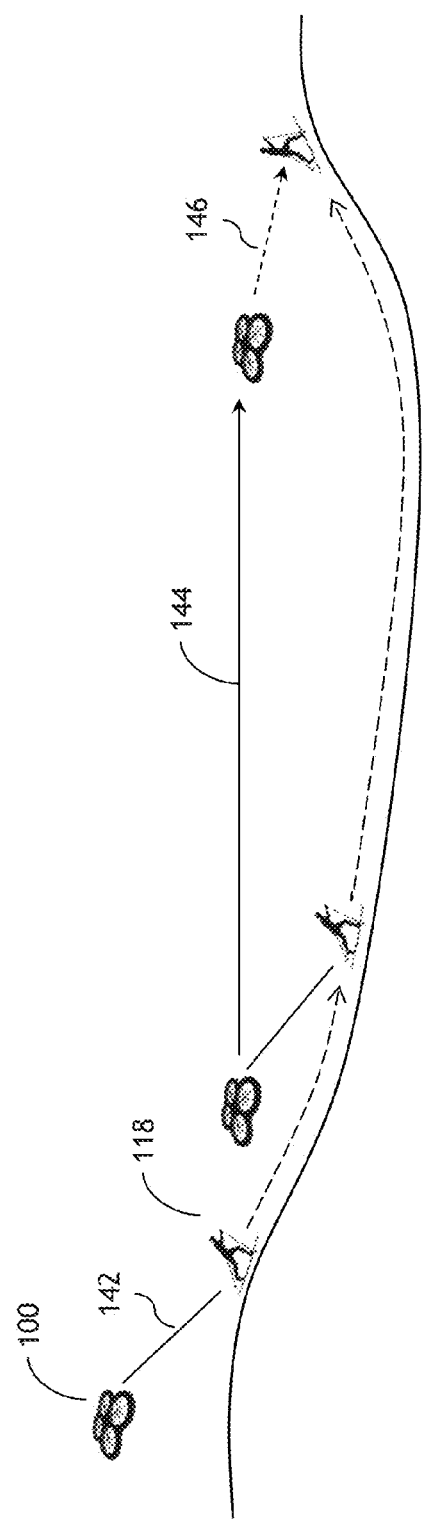
FIGS. 3, 4, and 5 are illustrations of a system for following a subject via an unmanned aerial vehicle according to embodiments of the present disclosure.
Figure 4:
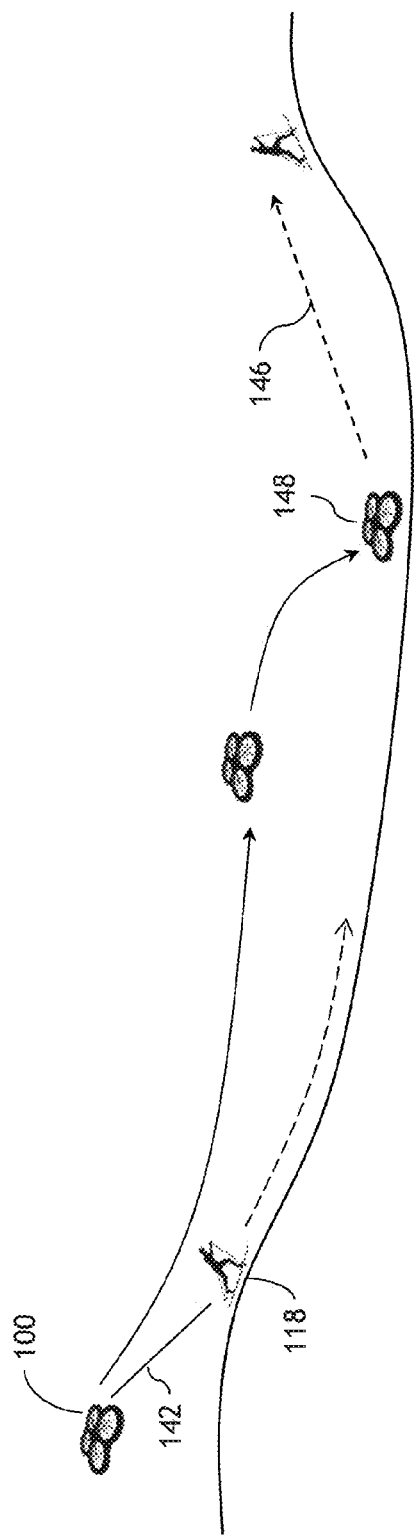

Referring to FIG. 4, the UAV may follow a subject 118 at a predetermined orientation (142) as shown by FIG. 3. If the available power level drops below a critical threshold (e.g., 5 percent capacity), the power supply 136 may not have sufficient charge for the attitude control system 106 to maintain the UAV 100 aloft for a significant amount of time (assuming, for example, that the power management system 140 has already diverted remaining power to the attitude control system 106 as shown above by FIG. 3). The power management system 140 may then direct the attitude control system 106 to utilize remaining power to safely land the UAV 100 as soon as possible. For example, the UAV 100 may use position data received from the communications device 106 or position data received from onboard position sensors (if such data is available) to determine a safe landing site 148 for the UAV 100 based on any available data on the position or altitude of the UAV 100. The power management system 140 may generate an alert and transmit the alert (146) to the communications device 106 (via the transceiver 114) to notify the subject 118 of the critical threshold or the imminent landing of the UAV 100.

Figure 5:
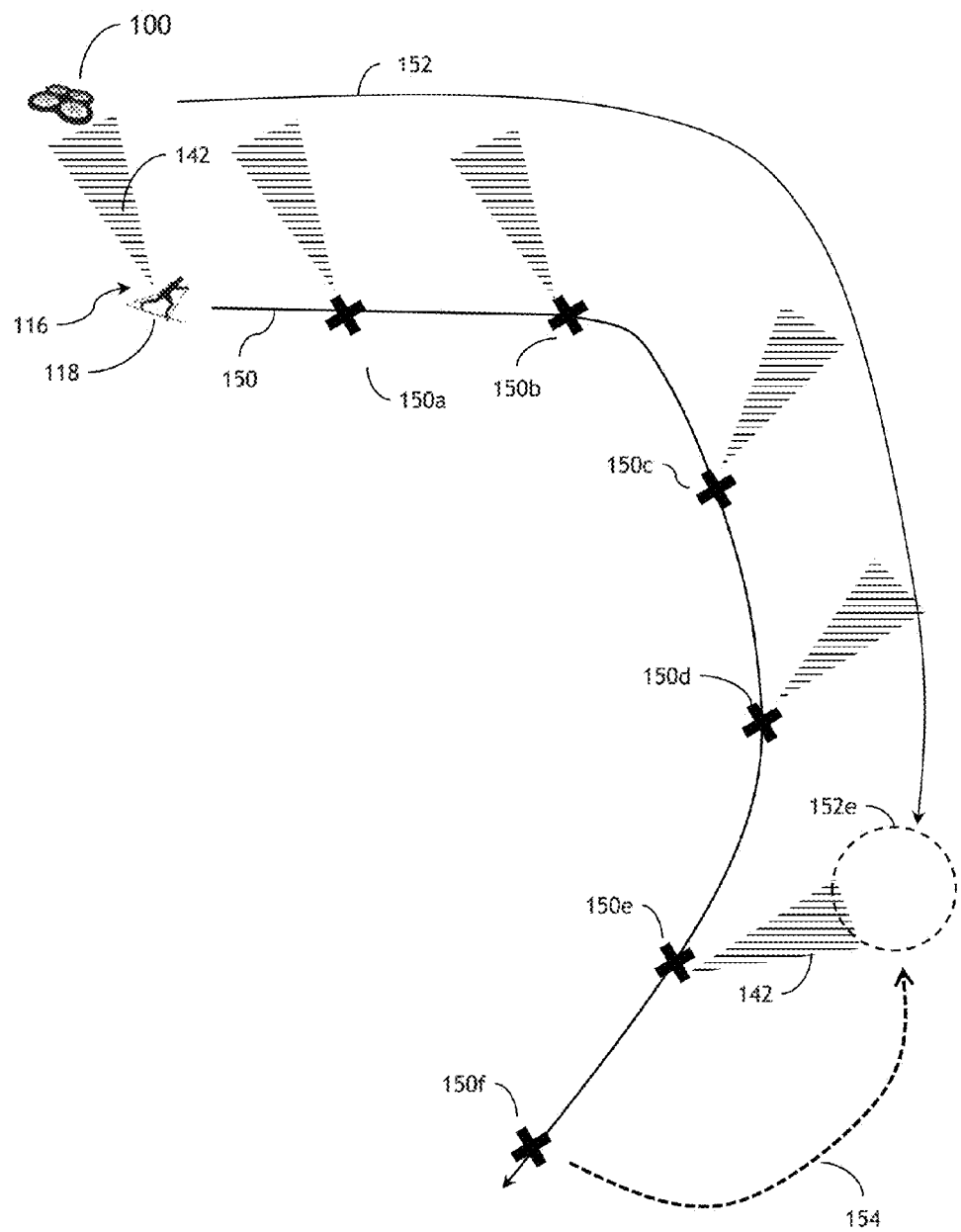

Referring to FIG. 5, if the power management system 140 of the UAV 100 indicates a critical threshold requiring an emergency landing 148 as shown in FIG. 4, the communications device 106 may use position data to assist recovery of the UAV 100. For example, the subject 118 may proceed through a course 150 while the UAV 118 follows along a parallel course 152 defined by the predetermined orientation 142. At intervals (indicated by points 150a, 150b, 150c, 150d, 150e, and 150f along the course 150), the position sensors 124 of the communications device 116 may determine a position of the subject 118. The position sensor 132 may be a GNSS, GPS, or other satellite positioning receiver configured to determine an absolute position of the subject 118 (e.g., latitude, longitude, altitude) or an accelerometer, magnetometer, compass, or other inertial/displacement sensor configured to determine a relative position of the subject 118 (relative, for example, to a prior relative position of the subject 118). The processor 126 of the communications device 116 may then "timestamp" this determined position by associating with the position a precise time, as determined by a clock 128 of the communications device 116. The communications device 116 may store the resulting timestamp, or sequence of timestamps, in memory 130.

The subject 118 may, via applications installed on the communications device 116 and which access the processor 126, define or set the orientation 142 at which the UAV will follow its subject 118. Similarly, the processor may use the defined orientation 142 (of the UAV 100 relative to the subject 118) and stored timestamp data indicating prior positions of the subject 118 to interpolate the approximate position of the UAV 100 relative to a determined position of the subject 118. For example, when the subject 118 is at point 150e, based on its predetermined orientation 142 the approximate position of the UAV 100 should be in the region 152e. Therefore, if the communications device 116 receives a critical threshold alert from the UAV 100 (indicating an emergency landing) while the subject is between points 150e and 150f, the communications device 116 may interpolate the position of the UAV 100 within area 152e and direct the subject 118 to proceed (154) to the region 152e where the UAV 100 is most likely to be recovered. The communications device 116 may direct the subject 118 to the region 152e via map overlays, animations, or other graphic alerts displayed via the display unit 134. For example, if the power management system 140 indicates a power threshold and thereby scales back or discontinues the streaming video feed transmitted by the UAV 100 to the communications device 116, the display unit 134 may automatically switch from the video feed to a recovery display indicating the approximate position of the UAV 100 and/or the current position of the subject 118.

Figure 6A:
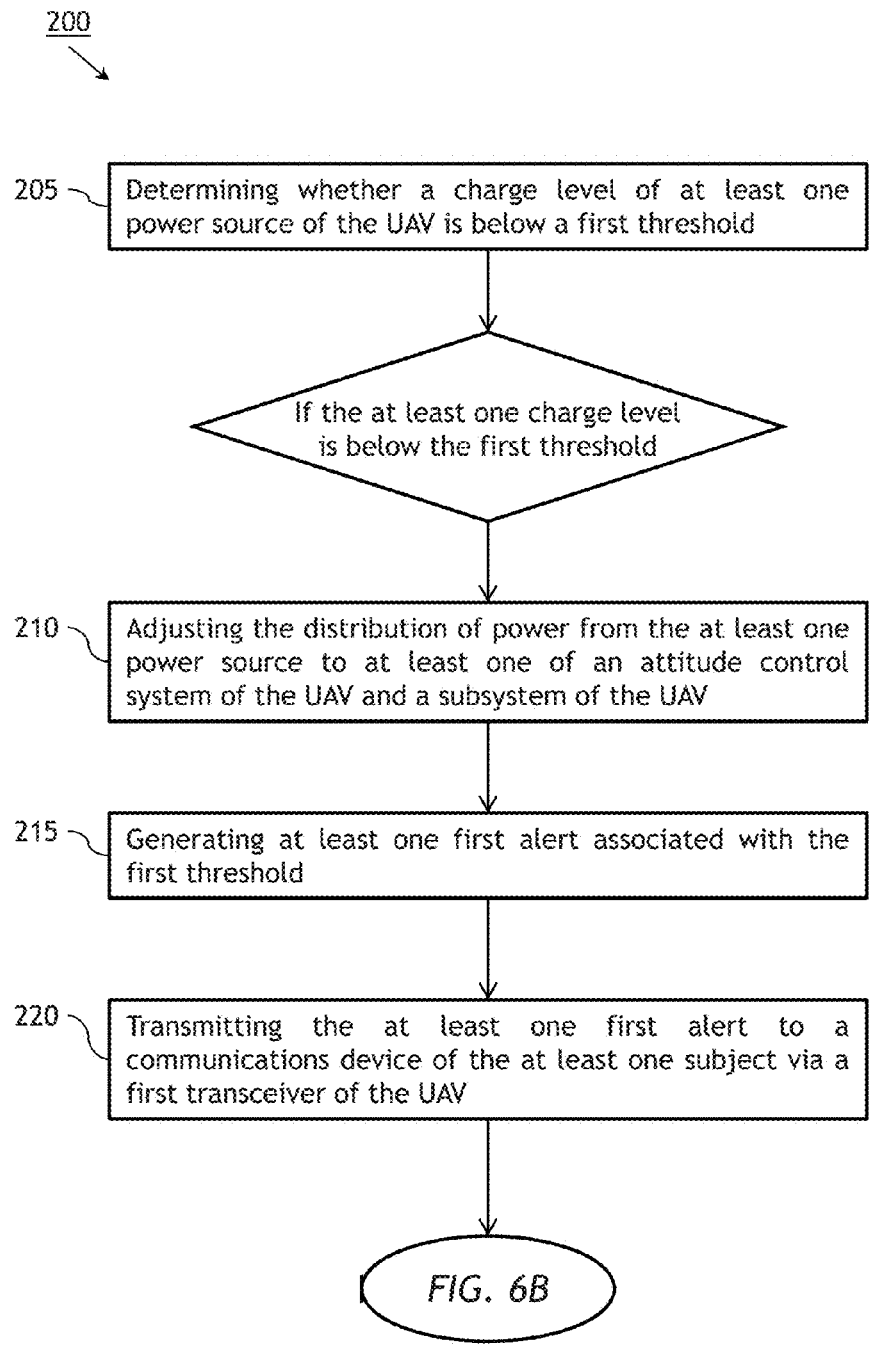
FIGS. 6A, 6B, and 6C are process flow diagrams illustrating methods of operation according to embodiments of the present disclosure.
Figure 6B:
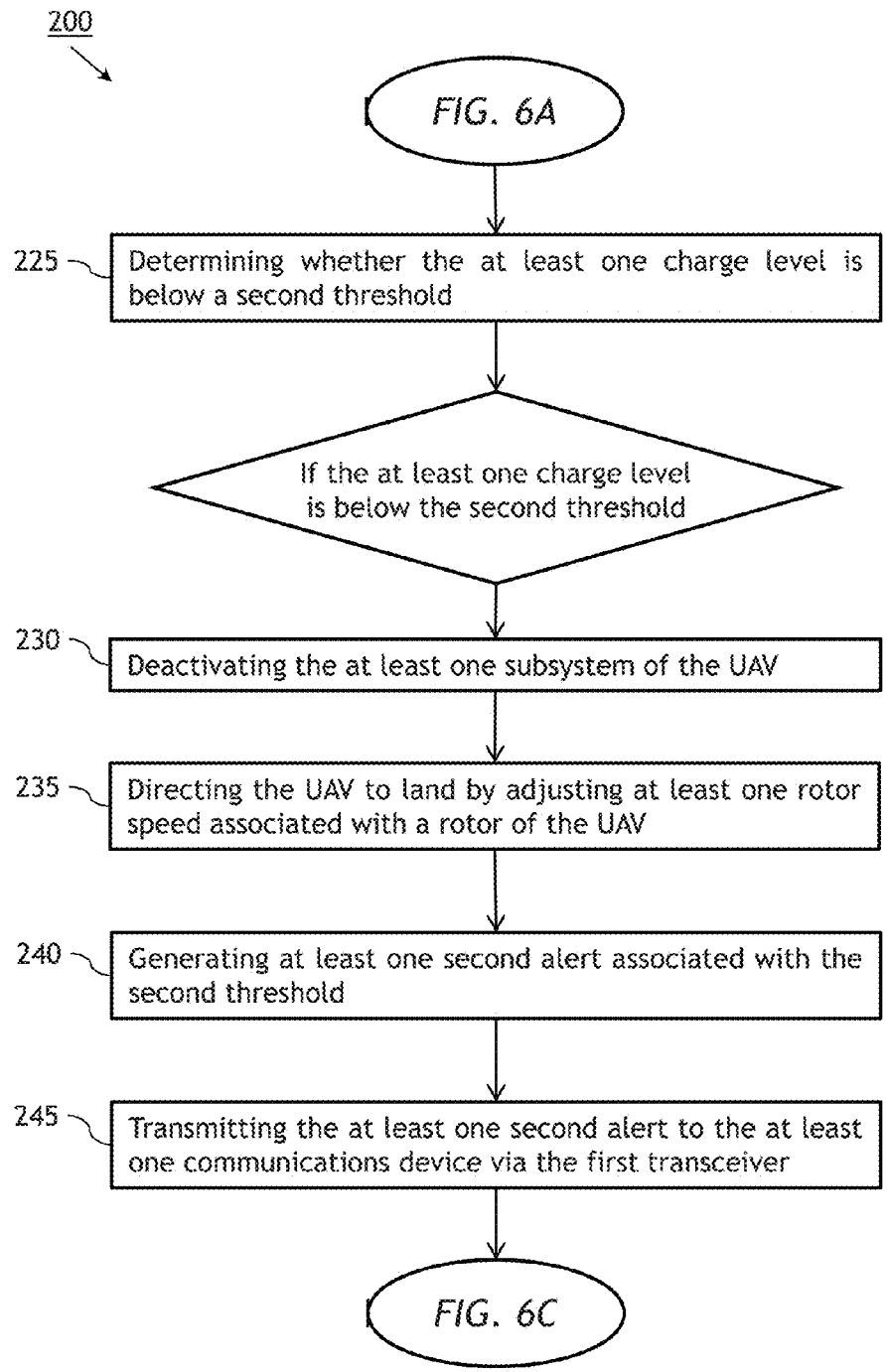
Figure 6C:
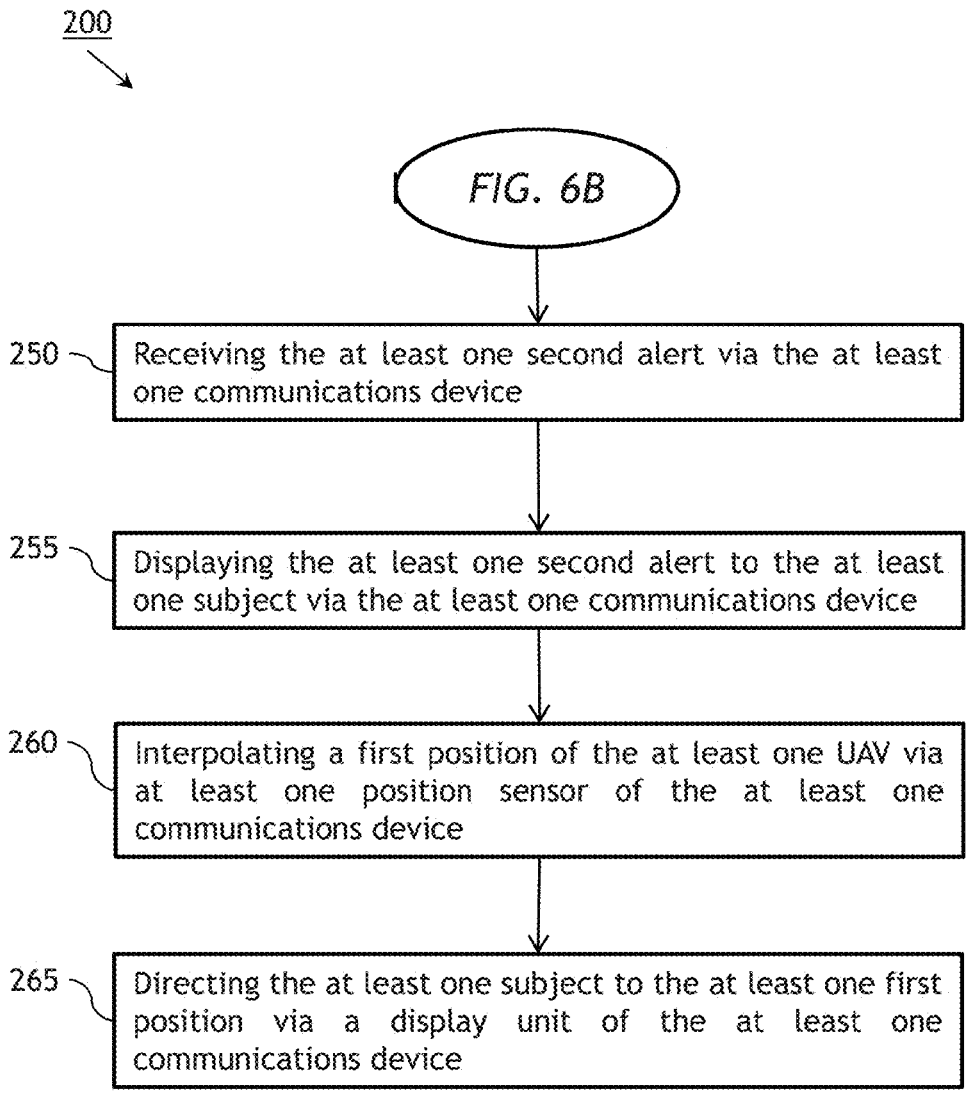

FIGS. 6A, 6B, and 6C illustrate a process flow diagram of a method 200 for power management aboard an unmanned aerial vehicle (UAV) 100 configured to follow at least one subject 118, according to embodiments of the present disclosure. It is noted herein that the method 200 may be carried out utilizing any of the embodiments described previously. It is further noted, however, that method 200 is not limited to the components or configurations described previously as multiple components and/or configurations may be suitable for executing method 200.

At a step 205, the power monitor 138 determines whether a charge level of a power source 136 of the UAV 100 is below a first threshold.

At a step 210, if the charge level is below the first threshold, the power management system 140 adjusts the distribution of power from the power source 136 to at least one of the attitude control system 106 of the UAV 100 and a subsystem of the UAV.

At a step 215, the power management system 140 generates a first alert associated with the first threshold.

At a step 220, the power management system 140 transmits the first alert to a communications device 116 of the subject 118 via a first transceiver 114 of the UAV.

Referring to FIG. 6B, the method 200 may include additional steps 225, 230, 235, 240, and 245. At a step 225, the power monitor 136 determines whether the charge level is below a second threshold.

At a step 230, if the charge level is below the second threshold, the power management system 140 deactivates at least one non-propulsion subsystem of the UAV 100.

At a step 235, the attitude control system 106 directs the UAV 100 to land by adjusting one or more rotor speeds associated with a rotor 102 of the UAV 100.

At a step 240, the power management system 140 generates a second alert associated with the second threshold.

At a step 245, the power management system 140 transmits the second alert to the communications device 116 via the first transceiver 114.

Referring to FIG. 6C, the method 200 may have further steps 250, 255, 260, and 265. At a step 250, the communications device 116 receives the at least one second alert.

At a step 255, the communications device 116 displays the second alert to the subject 118 via the display unit 134.

At a step 260, the communications device 116 interpolates a position of the UAV 100 via a position sensor 132 of the communications device 116.

At a step 265, the communications device 116 directs the subject 118 to the interpolated position of the UAV 100 via the display unit 134.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An unmanned aerial vehicle (UAV) comprising:
an airframe;
one or more rotors fixed to the airframe;
one or more motors coupled to the one or more rotors, the one or more motors configured to articulate the one or more rotors at one or more rotor speeds;
an attitude control system coupled to the one or more motors, the attitude control system configured to determine the one or more rotor speeds;
at least one tracking component, the at least one tracking component including at least one of
(1) a camera configured to capture at least one image associated with a subject, the UAV configured to follow the at least one subject at a predetermined orientation based on the at least one image;
(2) an image processor configured to generate at least one image stream based on the at least one image; and
(3) a first transceiver configured to establish a wireless link with a communications device carried by the at least one subject;
at least one power source having a charge level;
a power monitor coupled to the at least one power source, the power monitor configured to determine the at least one charge level;
a power management system coupled to the power monitor and configured to
(1) receive the at least one charge level from the power monitor;
(2) determine whether the at least one charge level is below a first threshold;
(3) if the at least one charge level is below the first threshold, adjust the distribution of power from the at least one power source to one or more of the attitude control system and the one or more tracking components based on the at least one charge level.

2. The UAV of claim 1, wherein the power management system is configured to:
generate at least one first alert associated with the first threshold; and
transmit the at least one first alert to the at least one subject.

3. The UAV of claim 1, wherein the power management system is configured to
determine whether the at least one charge level is below a second threshold; and
if the at least one charge level is below the second threshold, deactivate the at least one tracking component and direct the attitude control system to land the UAV by adjusting the one or more rotor speeds.

4. The UAV of claim 3, wherein the power management system is configured to:
generate at least one second alert associated with the second threshold; and
transmit the at least one alert to the at least one subject.

5. A system for tracking at least one subject, the system comprising:
at least one unmanned aerial vehicle (UAV), the at least one UAV including
an airframe;
one or more rotors fixed to the airframe;
one or more motors coupled to the one or more rotors, the one or more motors configured to articulate the one or more rotors at one or more rotor speeds;
an attitude control system coupled to the one or more motors, the attitude control system configured to determine the one or more rotor speeds;
at least one tracking component, the at least one tracking component including at least one of
(1) a camera configured to capture at least one image associated with the at least one subject, the UAV configured to follow the at least one subject at a predetermined orientation based on the at least one image;
(2) an image processor configured to generate at least one image stream based on the at least one image; and
(3) a first transceiver configured to establish a wireless link with a communications device carried by the at least one subject;
at least one power source having a charge level;
a power monitor coupled to the at least one power source, the power monitor configured to determine the at least one charge level;
at least one power management system coupled to the power monitor and configured to 1) receive the at least one charge level from the power monitor and 2) based on the at least one charge level, distribute power from the at least one power source to one or more of the attitude control system and the at least one tracking component;
the at least one communications device including at least one position sensor configured to determine a first position of the at least one subject;
a clock configured to associate a time with the at least one first position;
at least one processor configured to generate one or more timestamps, each timestamp of the one or more timestamps including at least a first position and a time associated with the first position;
a memory configured to store the at least one timestamp;
a second transceiver configured to transmit the at least one timestamp to the at least one UAV via the wireless link;
the at least one processor further configured to 1) determine the at least one orientation; 2) transmit the at least one orientation to the at least one UAV via the wireless link; and
at least one display unit.

6. The system of claim 5, wherein the power management system is configured to
determine whether the at least one charge level is below a first threshold;
if the at least one charge level is below the first threshold, 1) distribute power to the attitude control system and 2) distribute power to at least one tracking component based on the distribution of power to the attitude control system.

7. The system of claim 6, wherein the power management system is configured to
generate at least one first alert associated with the first threshold; and
transmit the at least one first alert to the at least one communications device via the wireless link.

8. The system of claim 5, wherein the power management system is configured to
determine whether the at least one charge level is below a second threshold;
if the at least one charge level is below the second threshold, 1) deactivate at least one tracking component and 2) direct the attitude control system to land the at least one UAV by adjusting the one or more rotor speeds.

9. The system of claim 8, where the power management system is configured to
generate at least one second alert associated with the second threshold; and
transmit the at least one second alert to the at least one communications device via the wireless link.

10. The system of claim 9, wherein:
the at least one processor is configured to interpolate at least one second position of the at least one UAV based on the at least one timestamp and the at least one orientation; and
the memory is configured to store the at least one second position.

11. The system of claim 9, wherein the at least one communications device is configured to:
when at least one of a first alert and a second alert is received, notify the at least one subject via at least one of an auditory alert, a haptic alert, and a visual alert displayed by the display unit; and
when a second alert is received, direct the at least one subject to return to at least one second position via the at least one display unit.

12. The system of claim 5, wherein the at least one communications device includes at least one of a smartphone, a tablet, and a portable computing device.

13. The system of claim 5, wherein the at least one position sensor includes at least one of a GNSS receiver, an accelerometer, a magnetometer, a compass, an inertial sensor, and a displacement sensor.

14. The system of claim 5, wherein:
the at least one communications device includes a Received Signal Strength Indicator (RSSI) configured to determine a signal strength of the wireless link; and
each timestamp of the one or more timestamps includes a first signal strength associated with at least one of the first position and the associated time.

15. A method for power management aboard an unmanned aerial vehicle (UAV) configured to follow at least one subject, the method comprising:
determining whether a charge level of at least one power source of the UAV is below a first threshold; and
if the at least one charge level is below the first threshold,
adjusting the distribution of power from the at least one power source to at least one of an attitude control system of the UAV and a subsystem of the UAV;
generating at least one first alert associated with the first threshold; and
transmitting the at least one first alert to a communications device of the at least one subject via a first transceiver of the UAV.

16. The method of claim 15, wherein adjusting the distribution of power from the at least one power source to at least one of an attitude control system of the UAV and a subsystem of the UAV includes:
adjusting the distribution of power from the at least one power source to at least one of an attitude control system of the UAV and at least one of a camera of the UAV configured to capture at least one image, the UAV configured to follow the at least one subject based on the at least one image;
an image processor of the UAV, the image processor configured to generate at least one image stream based on the at least one image; and
the first transceiver.

17. The method of claim 15, wherein adjusting the distribution of power from the at least one power source to at least one of an attitude control system of the UAV and a subsystem of the UAV includes:
reducing the power supply to the at least one subsystem of the UAV.

18. The method of claim 15, further comprising:
determining whether the at least one charge level is below a second threshold;
if the at least one charge level is below the second threshold,
deactivating the at least one subsystem of the UAV;
directing the UAV to land by adjusting at least one rotor speed associated with a rotor of the UAV;
generating at least one second alert associated with the second threshold; and
transmitting the at least one second alert to the at least one communications device via the first transceiver.

19. The method of claim 18, further comprising:
receiving the at least one second alert via the at least one communications device;
displaying the at least one second alert to the at least one subject via the at least one communications device;
interpolating a first position of the at least one UAV via at least one position sensor of the at least one communications device;

directing the at least one subject to the at least one first position via a display unit of the at least one communications device.

20. The method of claim 19, wherein displaying the at least one second alert to the at least one subject via the at least one communications device includes:
  displaying the at least one second alert to the at least one subject via the at least one communications device by at least one of an auditory alert, a haptic alert, and a visual alert displayed by the at least one display unit.

* * * * *